A. S. DYSART.
WEIGHING SCALE.
APPLICATION FILED DEC. 26, 1914.
1,215,638.
Patented Feb. 13, 1917.
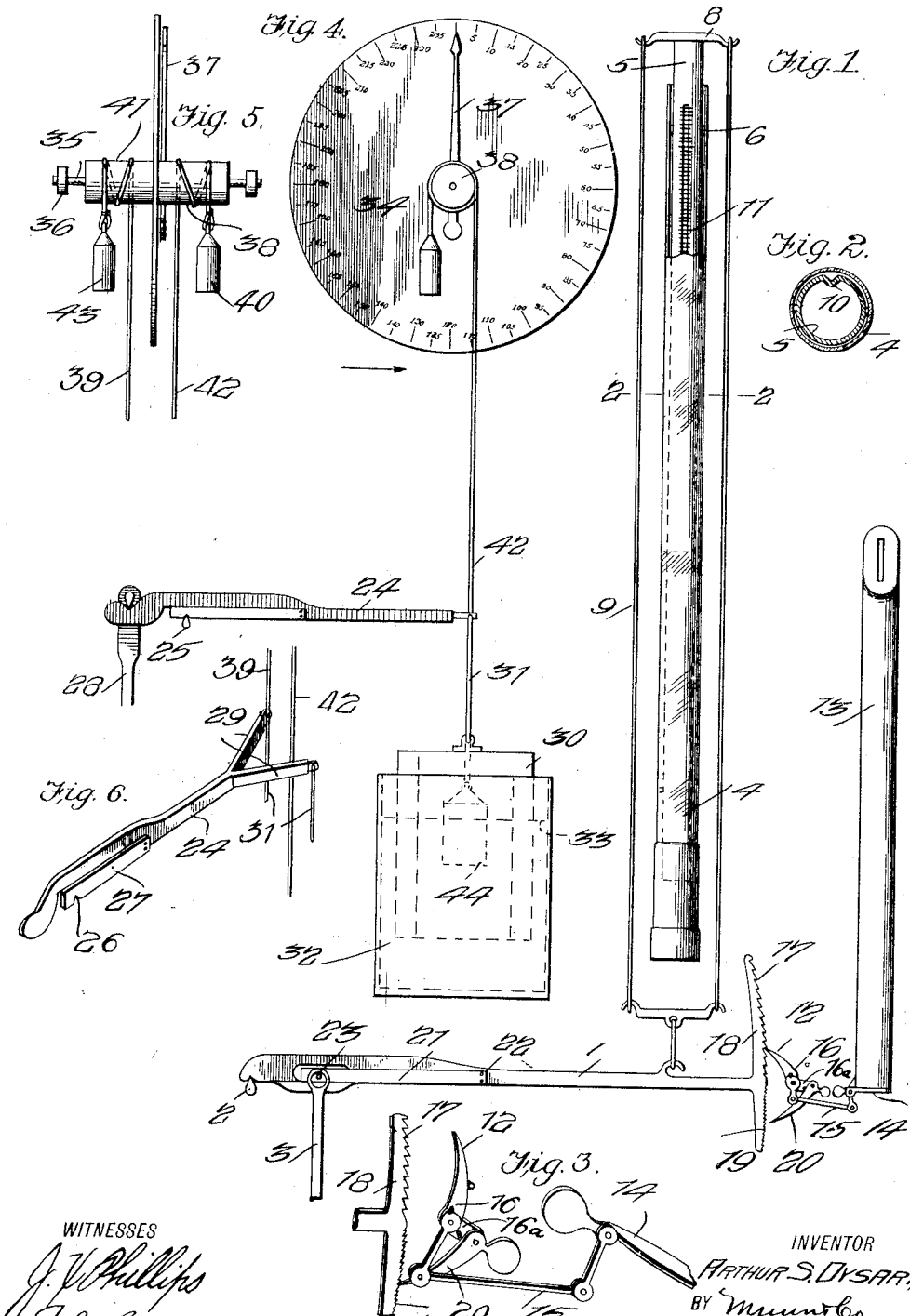
WITNESSES
J. V. Phillips
John Cook
INVENTOR
Arthur S. Dysart,
BY Munn & Co.
ATTORNEYS

UNITED STATES PATENT OFFICE.

ARTHUR SAMUEL DYSART, OF NORFOLK, VIRGINIA.

WEIGHING-SCALE.

1,215,638.  Specification of Letters Patent.  Patented Feb. 13, 1917.

Application filed December 26, 1914. Serial No. 879,076.

*To all whom it may concern:*

Be it known that I, ARTHUR S. DYSART, a citizen of the United States, and a resident of Norfolk, in the county of Norfolk and State of Virginia, have made certain new and useful Improvements in Weighing-Scales, of which the following is a specification.

This invention relates to weighing scales and more particularly to that class of scales in which the reactional force counterbalancing the weight of an object is supplied by the buoyant effect of a liquid.

An object of the present invention is to provide a scale totally devoid of resilient springs, and in lieu thereof to provide a member immersed in a liquid, the buoyant effect of the liquid upon the member supplying the reactional force for the counterbalancing of the object to be weighed.

A further object is to provide means whereby a change in the specific density of the liquid employed in accordance with temperatures, is compensated for.

A further object is to provide a scale of the class mentioned with a coin releasing mechanism so that the scale may be used for public weighing.

A further object is to provide a movably mounted dial and pointer, the arrangement being such that the scale reading will indicate the position of the weighing beam regardless of the height of liquid in which the counterbalancing member is immersed.

With the foregoing and other objects in view which will appear as the description proceeds, the invention resides in the combination and arrangements of parts and in the details of construction hereinafter described and claimed, it being understood that changes in the precise embodiment of the invention herein disclosed, can be made within the scope of what is claimed without departing from the spirit of the invention.

In the drawings accompanying this specification and forming a part thereof, the preferred embodiment of my invention is illustrated, in which:—

Figure 1 is a view in elevation of my novel weighing scale.

Fig. 2 is a cross sectional view taken on line 2—2 of Fig. 1.

Fig. 3 is a detail view in perspective of the coin controlled mechanism.

Fig. 4 is a view in elevation of a somewhat modified form of scale.

Fig. 5 is a detail side view of the revolving disk and pointer used in connection therewith looking at Fig. 4 in the direction of the arrow.

Fig. 6 is a view in perspective of the scale beam.

Referring to the drawings in which similar reference numerals designate corresponding parts throughout the several views, a scale beam 1 is fulcrumed at its one extremity and so supported by the bearing 2. A link 3 is pivotally secured to the scale beam and is adapted to connect the same to the platform of a weighing scale or allied apparatus whose weight is to be determined.

The linkage 3 will accordingly exert a force upon the scale beam 1 in a downward direction and in order to provide an indicating and counterbalancing mechanism the elongated reservoir 4 is provided in which reciprocates the buoyant tube 5. The tube 5 is provided with the outstanding lugs 6 thus maintaining the tube and reservoir in spaced sliding relation. The tube 5 is closed at its lower extremity and is immersed in a liquid 7 of known density. A bracket 8 is secured to the upper and exposed extremity of the buoyant member 5 and is pivotally connected to the scale beam 1 by the linkage 9 thus the moving of the scale beam 1 will produce a corresponding motion of the buoyant member.

The immersed buoyont member 5 closely approximates in size the internal diameter of the reservoir so that although a sliding action may take place in a free and unrestricted manner only slight clearance will be had therebetween thus a slight motion of the buoyant plunger 5 will cause a large change in the height of liquid within the reservoir, producing a proportionally large change in the counterbalancing effect applied to the scale beam. The buoyant plunger is, in the use of mercury, provided with a longitudinal groove or depression 10 so that the liquid will, on account of its negative capillarity, rise to a greater height in the slot than elsewhere allowing the scales 11 which are arranged along the sides of the slot to be easily read.

In order that the scales may be used for public weighing the coin releasing mechanism 12 is provided, the same including the coin receiving and delivering tube 13 at the lower extremity of which is placed the counterweighted door 14 to which a link 15 is pivotally secured. A lever 16 is connected to and actuated by the link 15 and acts in the capacity of a pawl engaging the ratchet teeth 17 formed on the ratchet bar 18. The ratchet bar is carried by the scale beam 1 and is provided with downwardly depending ratchet teeth 17 arranged above the scale beam and the upwardly extending ratchet teeth 19 arranged below the scale beam. The pawl 16 is adapted to engage the ratchet teeth 17 and when so positioned prevent the downward motion of the scale beam and therefore prevent weighing of any object which may be exerting a downward force upon the linkage 3. A coin dropped through the tube 13 will move the door 14 downwardly and release the pawl 16 thus releasing the scale beams.

A controlling pawl 20 is utilized in connection with the foregoing and is pivoted on a laterally projecting portion 16$^a$ of lever 16 and is arranged to engage the teeth 19 so that as soon as the weight is removed from the linkage 3 the rack bar and scale beam as they move upwardly will also move pawl 20 and thus swing lever 16 on its pivot and again move the same into engagement with the teeth 17 and prevent further use of the scale until another coin is deposited within the tube as will be seen by a comparison of Figs. 1 and 3.

The liquid within the reservoir 4 may be varied according to the class of service to which the scale is to be put, mercury being an example of a desirable liquid. The evaporation of this liquid will not be appreciable and will not cause error. The specific density of the liquid, however, will vary with temperatures for which reason a highly expansible and contractible metallic member 21 is provided rigidly secured at its one extremity 22 to the scale beam and supporting at its remote extremity the pivot pin 23 whereby the linkage 3 is supported. Thus the length of the respective arms of the scale beam will vary with temperature and compensate for the variation in the specific density of the liquid within the reservoir.

The somewhat modified form illustrated in Fig. 4 includes the scale beam 24 fulcrumed upon the bearing 25, the bearing seat 26 being carried by the expansible temperature compensating member 27. A link 28 connects the scale beam with the platform or apparatus whose weight is to be determined. The opposite extremity of the scale beam is bifurcated so as to include the diverging arms 29 to which the hollow cylindrical immersible member 30 is secured, the same being accomplished by the links 31. A tank or reservoir 32 receives the member 30 therein and is provided with the liquid 33 of known specific density whose buoyant effect, acting upon the member 30, provides a counterbalancing force resulting in the equilibrium of the scale beam 24.

A dial 34 is rotatably supported by a shaft 35 which latter is secured at its ends as at 36 in Fig. 5. A pointer 37 is secured to and carried by a drum 38 rotatably mounted upon the shaft 35 and around which extends a flexible element 42. This flexible element 42 is connected to a weight 40 and to a small float 44 depending within the immersed member 30 or larger float and also immersed within the liquid in the reservoir or tank 32.

Thus when the float 30 is raised, the smaller float 44 proportionately descends with the lowering of the liquid level, whereby the drum 38 is rotated in a clockwise direction by the float and against the tension of weight 40 so that the pointer 37 when read in connection with the scale upon the dial 34 thus indicates the weight of the object producing movement of the scale beam.

Considerable liquid must be used with this form of reservoir and for this reason a compensating device is provided for its evaporation or changing in level. This device includes the rotatable mounting of the dial 34 upon the shaft 35 in connection with a drum 41 around which extends a flexible element 39. This flexible element is provided with a small weight 43 and is connected to the scale beam 24, as best shown in Fig. 6, and thus to the float 30. It will be noted that the two flexible elements 42 and 39 are extended around their respective drums 38 and 41 in the same direction whereby any change in the level of the liquid in tank 32, due to natural causes including evaporation, will cause a similar rotation of both the dial 34 and pointer 37 and thus maintain their original relation at all times.

Thus also when the scale beam is raised, the dial and the pointer will be rotated in respectively opposite directions and a relatively greater degree of movement created at the point of weight reading than is present in the float 30 immersed in the liquid.

I claim:—

In a weighing scale, the combination with a scale beam, of a hydrostatic counterpoise including a vertical tubular transparent liquid reservoir, a float member immersed in the liquid within the said reservoir, and having its surface contiguous to the reservoir walls having a longitudinal groove, and having a graduated scale directly thereon and extending along the said groove, and connections between the said float member and the scale beam.

ARTHUR SAMUEL DYSART.

Witnesses:
C. SPENCER,
JOHN LANCE.

Copies of this patent may be obtained for five cents each, by addressing the "Commissioner of Patents, Washington, D. C."